United States Patent [19]

Jones

[11] Patent Number: 4,773,598

[45] Date of Patent: Sep. 27, 1988

[54] MULTI DIRECTION DUMP BODY FOR TRUCKS

[76] Inventor: Eldon D. Jones, Rte. 2, Box 230, Lake Crystal, Minn. 56055

[21] Appl. No.: 22,060

[22] Filed: Mar. 5, 1987

[51] Int. Cl.⁴ .................. B60P 1/28; E01C 19/20
[52] U.S. Cl. ............................ 239/657; 239/675; 298/17.7; 414/489; 414/526
[58] Field of Search .............. 239/657, 675; 298/17.7; 414/470, 489, 526

[56] References Cited

U.S. PATENT DOCUMENTS

| Re. 24,920 | 1/1961 | Palmer | 414/526 |
|---|---|---|---|
| 1,409,916 | 3/1922 | Barkman et al. | |
| 1,534,439 | 4/1925 | Burkhardt et al. | 298/17.7 X |
| 1,759,033 | 5/1930 | Davidson | |
| 1,993,203 | 3/1935 | Barrett | 298/17.7 |
| 2,060,652 | 11/1936 | Arnold | |
| 2,233,111 | 2/1941 | Roberts | |
| 2,770,376 | 11/1956 | Zinn | |
| 2,796,185 | 6/1957 | Bernstein | |
| 2,856,232 | 10/1958 | Mentes | |
| 2,953,408 | 9/1960 | Koenig | |
| 3,010,727 | 11/1961 | Swenson et al. | 239/657 |
| 3,552,659 | 1/1971 | Meyer | 239/657 |
| 3,620,458 | 11/1971 | Rath | 239/657 |
| 4,109,810 | 8/1978 | Jones | 214/505 |
| 4,261,520 | 4/1981 | Hetrick | 239/657 |
| 4,373,845 | 2/1983 | Henke | 414/326 |

FOREIGN PATENT DOCUMENTS

| 214108 | 3/1957 | Australia | 298/17.7 |
|---|---|---|---|
| 5531620 | 3/1980 | Japan | 298/17.7 |

OTHER PUBLICATIONS

Advertisement for De-icers from the brochure of the Highway Equipment Company.
Advertisement for Swenson Spreaders, brochure, page 5 of May, 1979.
Advertisement for Swenson Spreaders, brochure.
Advertisement for Spreader/Dumper from brochure Frink America G-59.
Specifications for Spread-n-Dump from brochure by HEIL America's Dump Truck.
Pictures of Dump Truck Beds from brochure by Meiller Company.
Advertisement on All Seasons Dump Body/Spreader from brochure by Viking Manufacturing Corp.
Advertisement on 4 Seasons Spreader Dumpbody from brochure by TENCO.

Primary Examiner—Andres Kashnikow
Assistant Examiner—Patrick N. Burkhart
Attorney, Agent, or Firm—Hall, Myers & Rose

[57] ABSTRACT

A dump truck body capable of dumping to either the right or left side or to the rear of the truck. The truck further includes a sand, salt or gravel spreader fed by a longitudinal auger running longitudinally from the front to rear of the truck body on either the left or right-hand side. The auger is fed by the side tilting of the dump body. The overall height of the truck is maintained at a minimum while in operation through the utilization of side-tilted spreading, as opposed to rearward-tilted spreading.

2 Claims, 16 Drawing Sheets

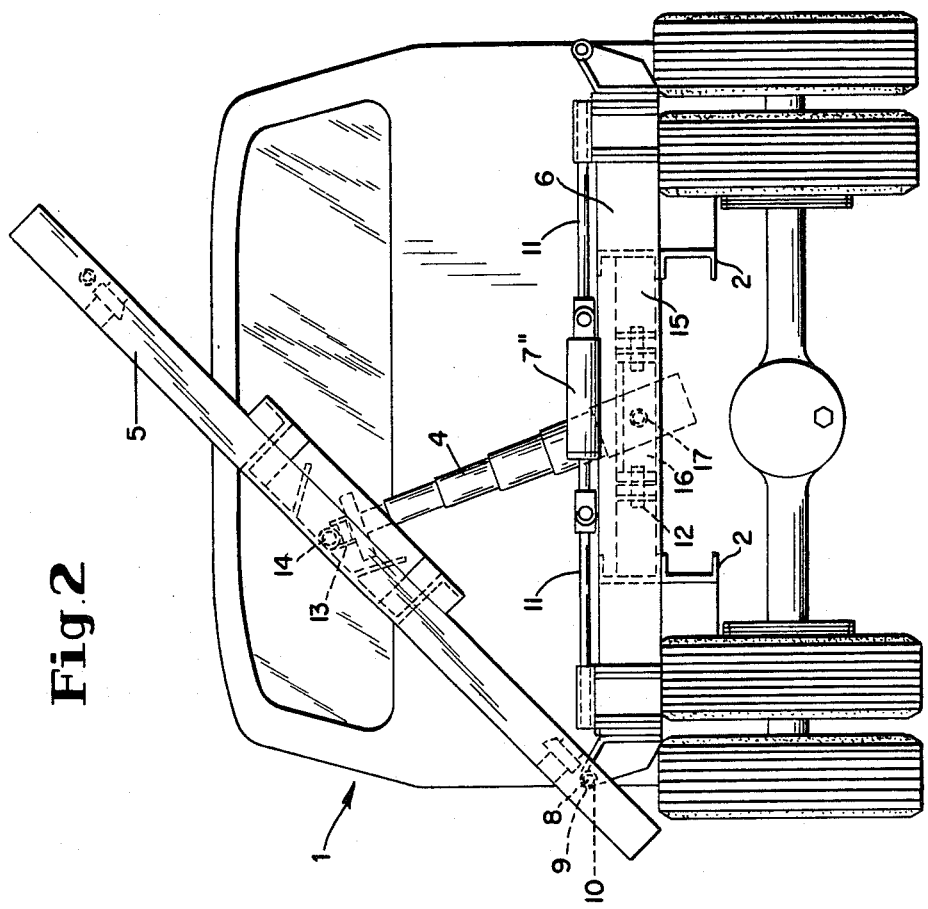

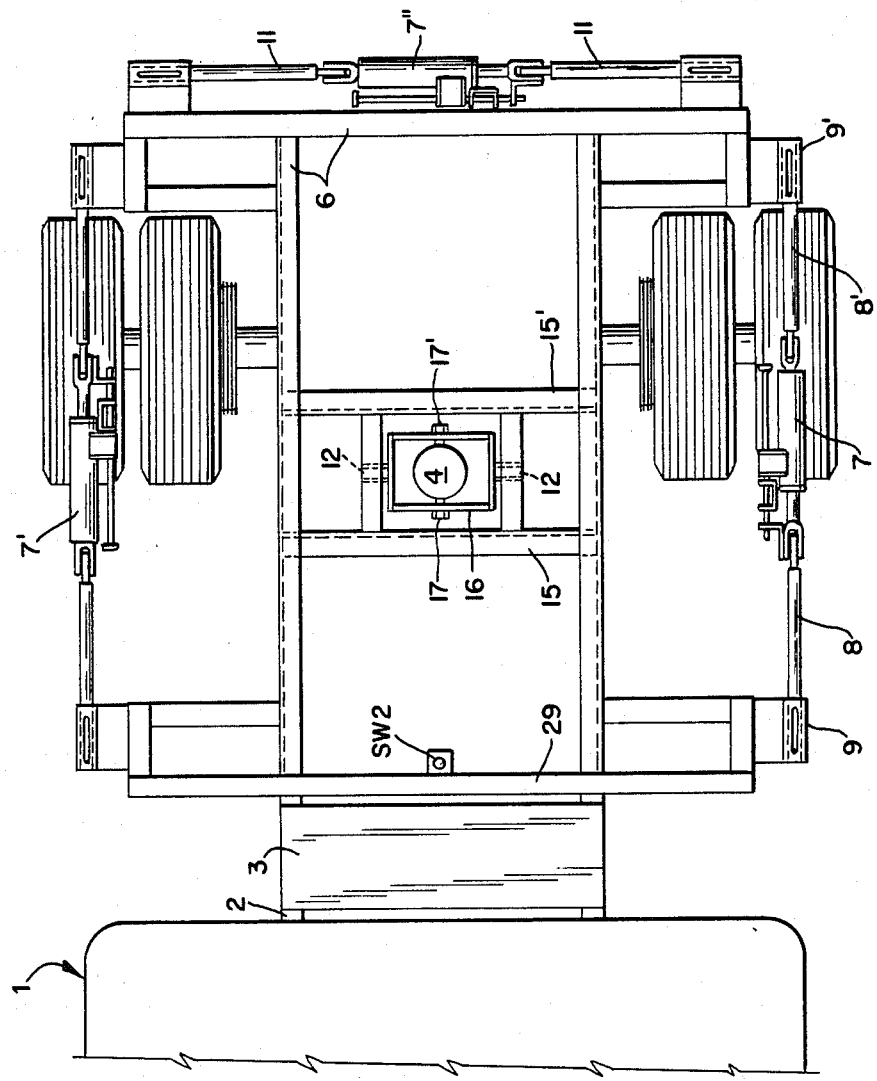

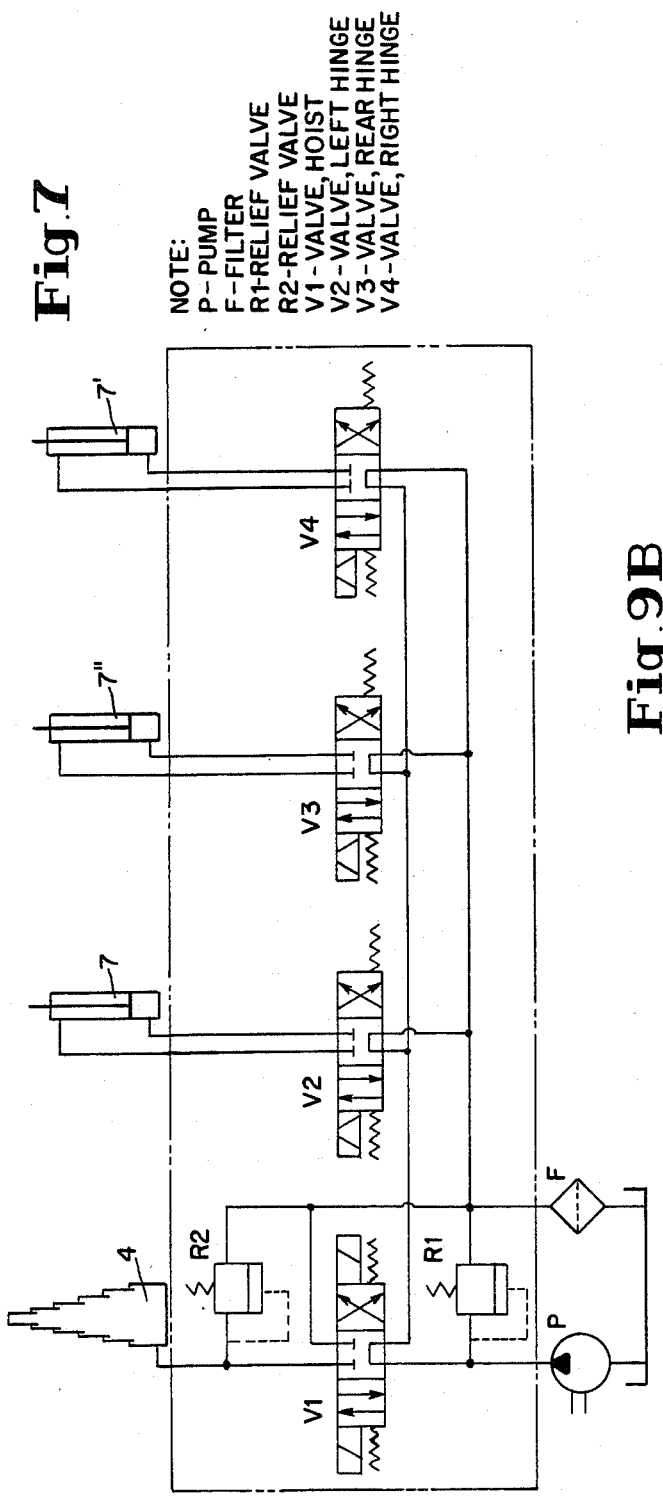
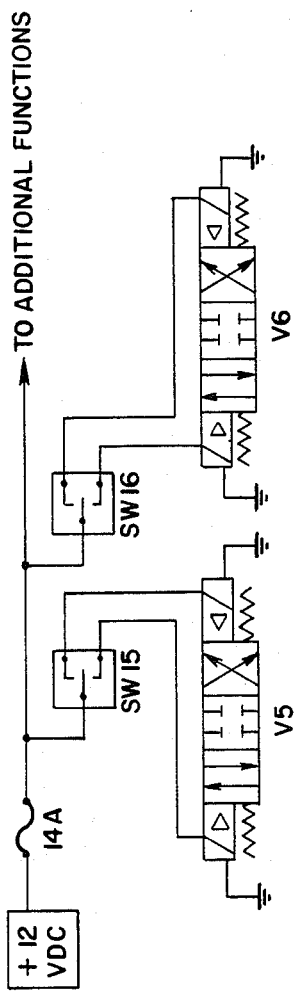
Fig. 7
NOTE:
P- PUMP
F- FILTER
R1- RELIEF VALVE
R2- RELIEF VALVE
V1- VALVE, HOIST
V2- VALVE, LEFT HINGE
V3- VALVE, REAR HINGE
V4- VALVE, RIGHT HINGE
Fig. 9B

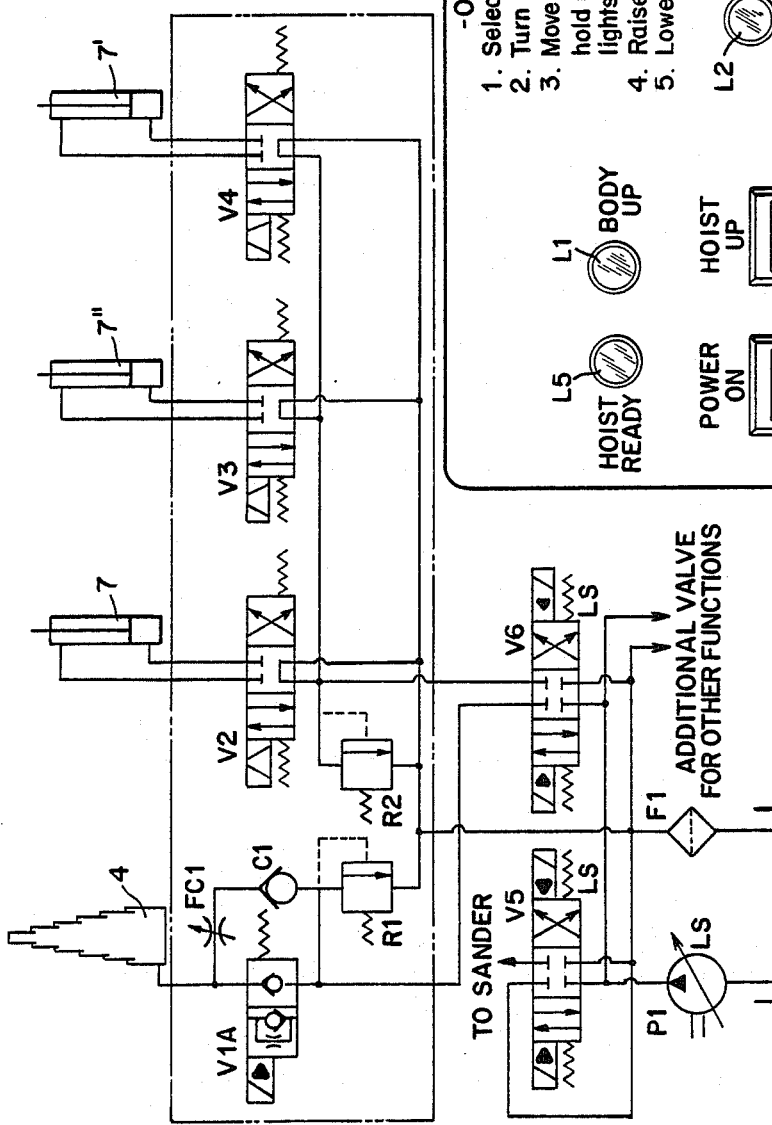
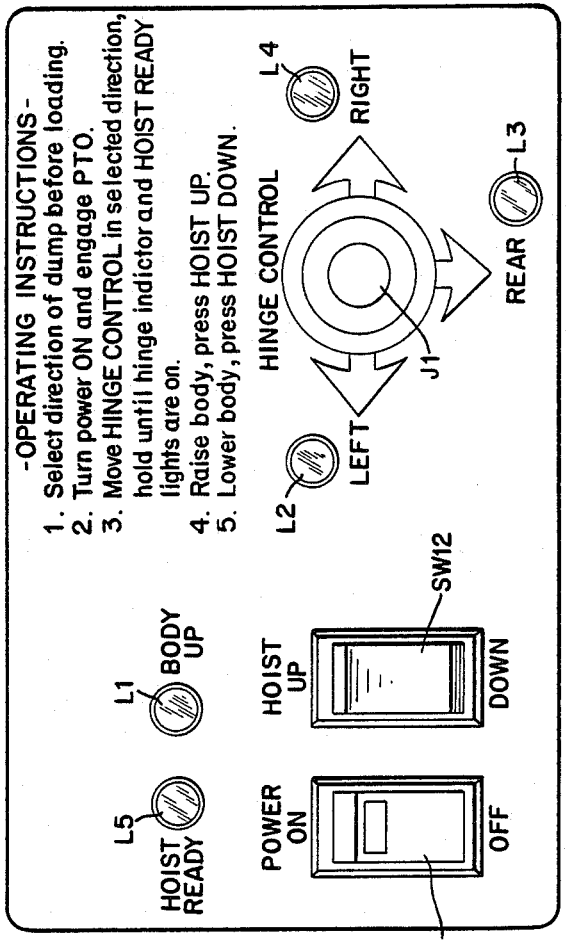
Fig. 11
Fig. 10

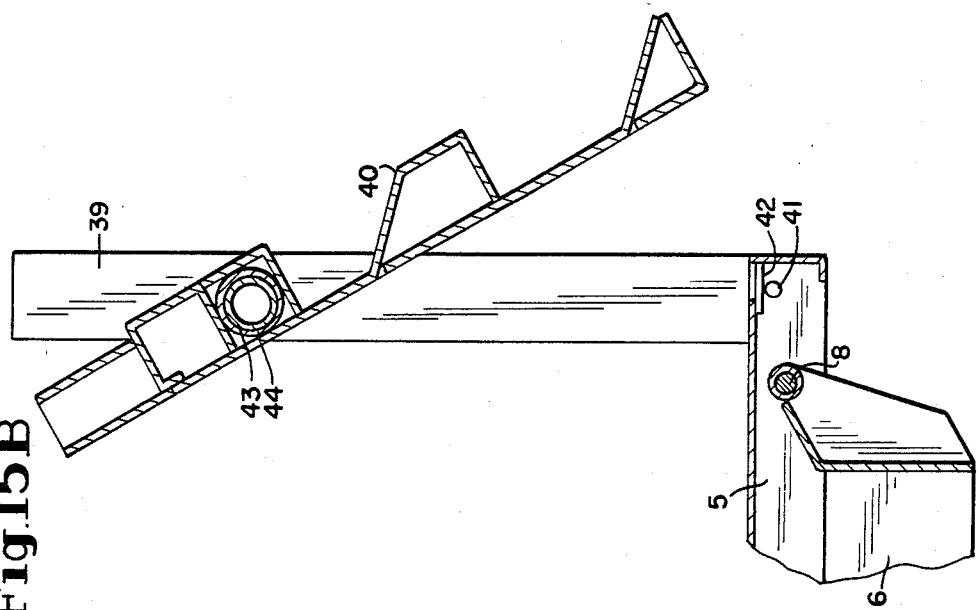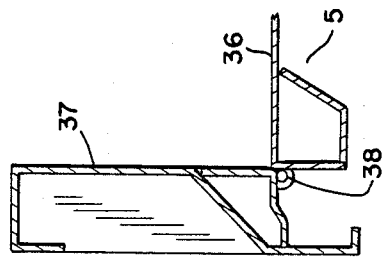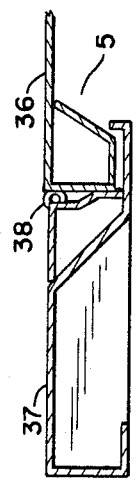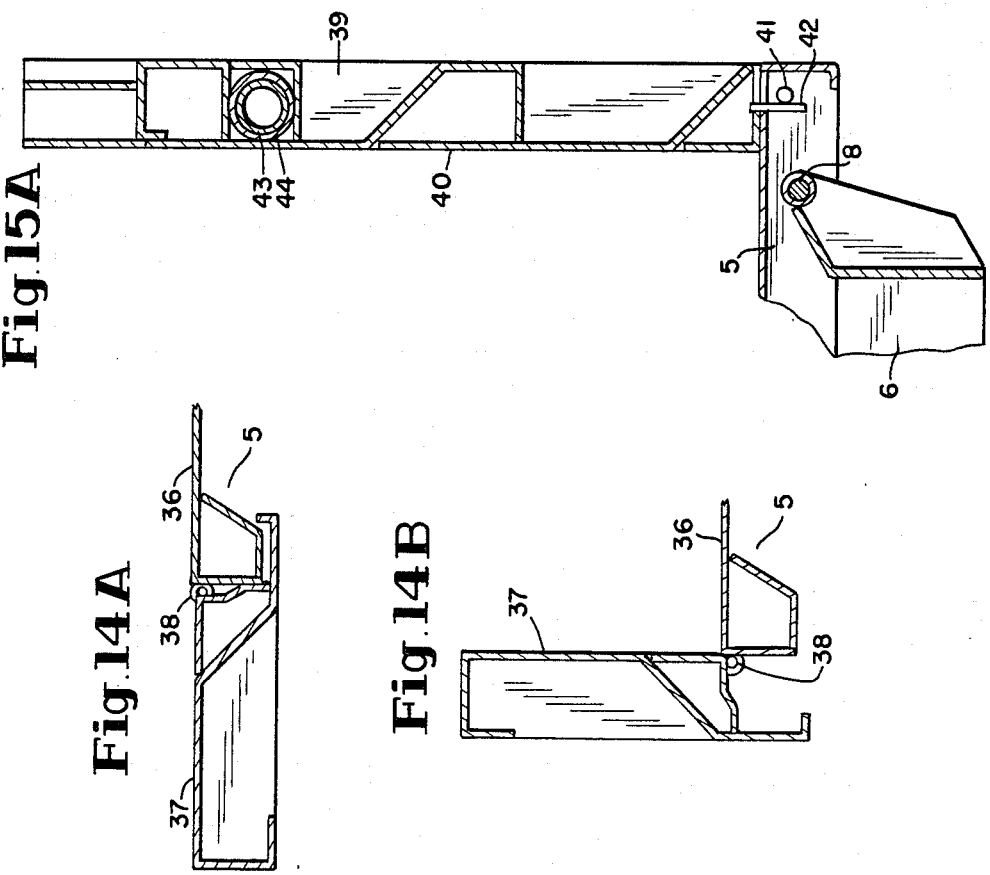

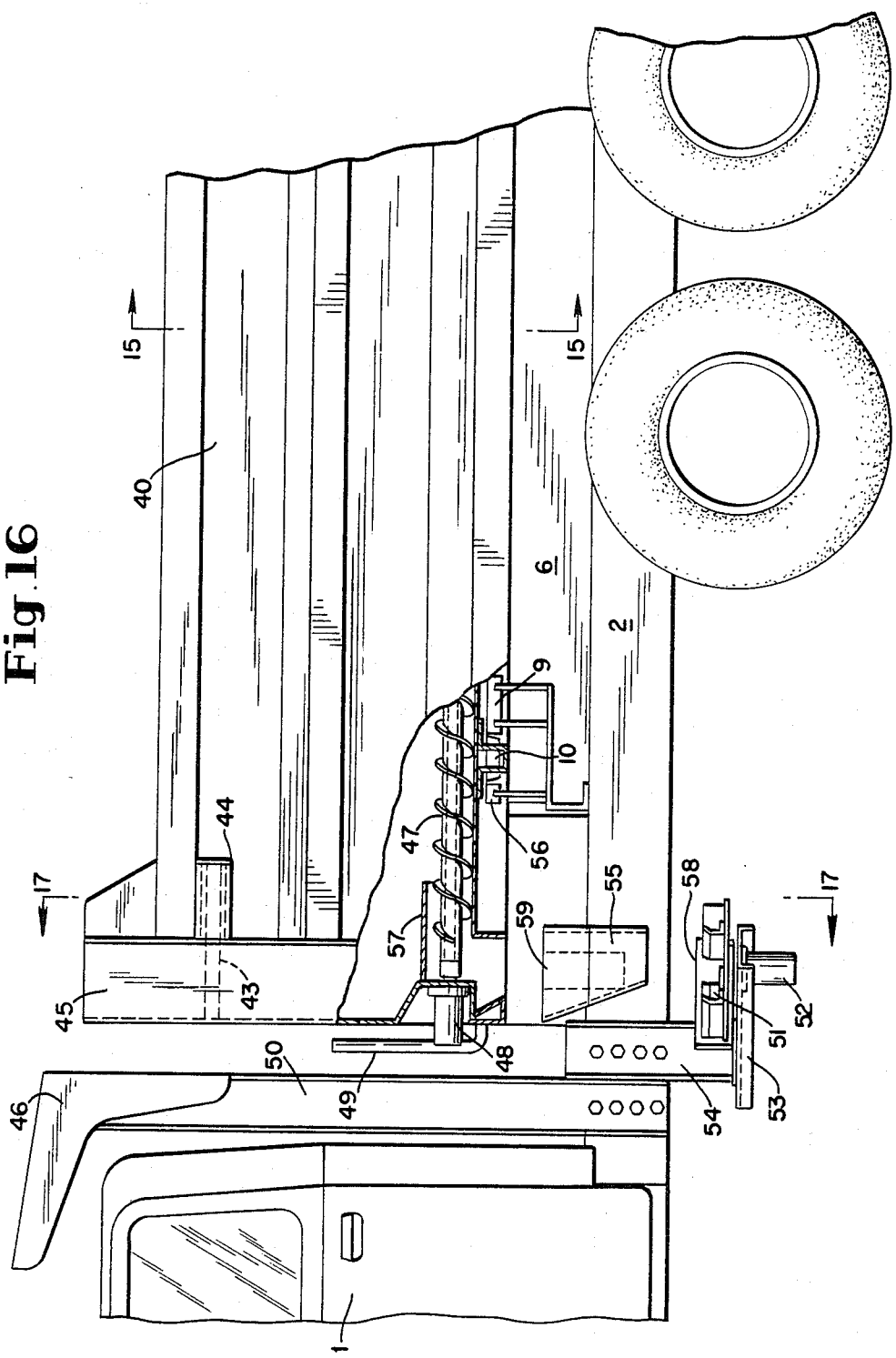

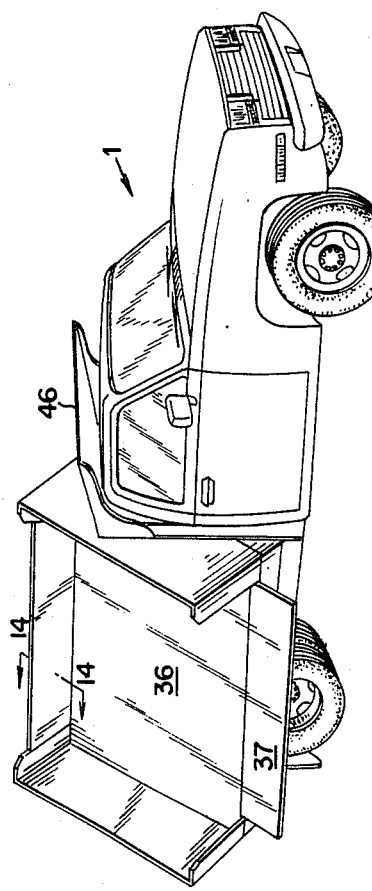
Fig.17
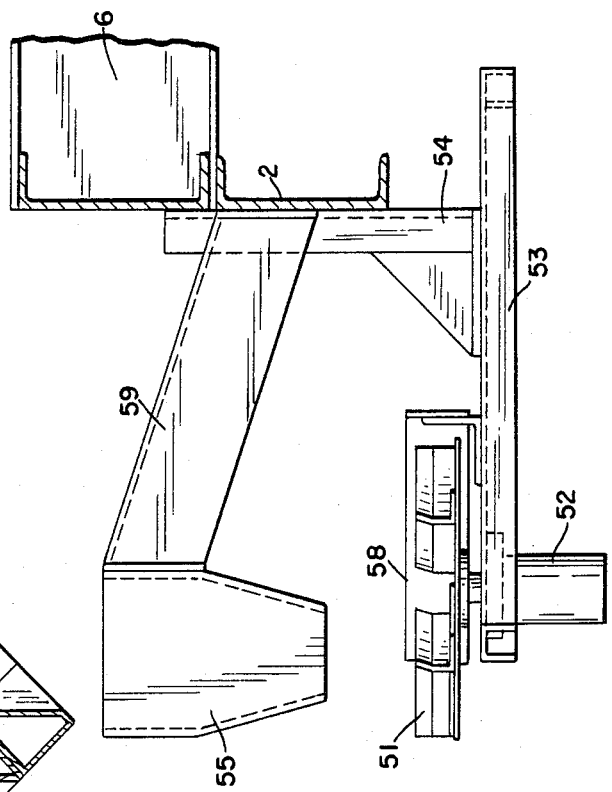
Fig.18
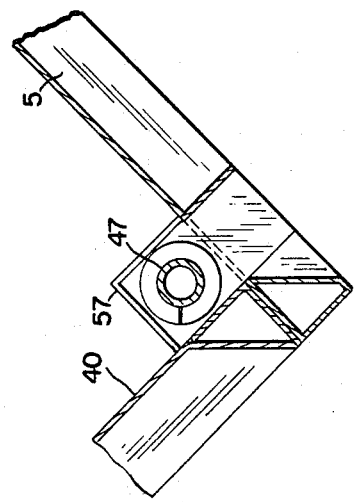

MULTI DIRECTION DUMP BODY FOR TRUCKS

BACKGROUND OF THE INVENTION

The present invention relates to dump trucks and more particularly to dump bodies with means for tilting of the body to either the left side, right side or towards the rear of the vehicle. The present invention further relates to means for spreading granular material onto roadways from a dump truck body, and more particularly to dump trucks having spreader attachments fed through body tilting.

Dump trucks are commonly used for distributing granular or pulverunent material, such as salt, calcium chloride or sand, onto icy road surfaces. This is commonly accomplished by attaching a spreader to the back end of the truck bed adjacent the outlet opening in the tailgate of the bed. The truck is then driven down a roadway with the bed tilted upwards in order to keep the outlet and spreader provided with the material to be distributed. Dump trucks utilized for the spreading of materials on roadways have a body which tilts towards the back end of the vehicle. Driving with the body tilted in such a manner shifts the center of gravity of the truck and impairs visibility. Also, due to the great height to which the front of the body is raised, tilting of the body presents an impact hazard to low wires, bridges or other obstacles.

Previous arrangements for dispensing with the truckbed in a horizontal position are also known, and have included non-tiltable beds with a bottom wall which slopes sharply upward and away from the bed outlet. This arrangement requires extremely high sidewalls to obtain the same volume capacity as a flat-bottom dumpbed, and wastes a considerable volume of space on the truck.

Other arrangements for dispensing from a flatbottom dumpbed without tilting include having a person standing in the bed and manually shoveling material to the outlet. This is not only very inefficient, but also very hazardous on a moving vehicle. Mechanical devices for moving material toward the outlet have also been proposed. However, these devices require extensive time for installation and removal, thereby making it difficult to convert the truck to conventional use when the ice and snow spreading season is completed.

Three-way dumpbodies are in common use in Europe and have been attempted to be utilized in the United States. These dump trucks suffer from a number of disadvantages. In order to accomodate the three-way tilt capability, the trucks have a significantally higher center of gravity, thereby causing greater instability during the shifting of the center of gravity upon tilting of the dumpbed.

One example of a three-way dump truck is taught in U.S. Pat. No. 2,953,408 to Koenig. The Koenig body suffers from all the disadvantages attendant other three-way dumpbodies known in the prior art. Koenig is also limited in teaching only a means for emptying of a truck bed in three directions, and does not teach the unique aspects of the present invention, and will not accomodate the highly-advantageous spreading mechanism taught by the present invention.

SUMMARY OF THE INVENTION

The present invention is comprised of a dumping apparatus for mounting to a truck body having a cab and a chassis the dumping apparatus has a subframe configured for attachment to the chassis of said truck and container means supported by said subframe, with at least three separate tilt hinge means disposed between said subframe and said container means, a first actuating means for enabling one of said tilt hinge means while disabling all other tilt hinge means, thereby providing a single pivotal axis for said container means relative to said subframe, the apparatus further provides elongated hoist means having a longitudinal axis and pivotally attached at a first end to said subframe and at a second end to said container means, with second actuating means for extending said hoist means along said longitudinal axis, wherein said container means tilts about said single pivotal axis formed by said enabled tilt hinge means upon elongation of said hoist means by said second actuation means.

In a further embodiment the present invention provides a spreader for distributing material carried by said truck and an auger for moving the material within the truck toward the spreader means.

Through the proper construction of a truck dump body and mounting as taught herein, the problems of the prior art are overcome through the utilization of a truck dump body which maintains a minimal height center of gravity during tilting operations and provides a minimal projection height to allow for unimpeaded spreading through tilting of the dump body to the left or right side to supply the spreader feed mechanism.

The present invention will now be described with respect to certain embodiments as illustrated in the following drawings:

BRIEF DESCRIPTION OF THE DRAWINGS

FIG. 2 is a back end view of a dump truck having the dumpbed tilted towards the left side.

FIG. 3 is a top view of a dump truck with the dumpbody and bed removed.

FIG. 7 is a hydraulic schematic illustrating the operation of the hoist cylinder.

FIGS. 9A and 9B comprise an electrical schematic of a dump truck utilizing a central hydraulic system for control of bed-tilting as well as other hydraulic mechanisms.

FIG. 10 is an hydraulic schematic of a central hydraulic system utilized with the electrical schematic of FIGS. 9A and 9B.

FIG. 11 is a front view of the operator's control panel for the present invention.

FIGS. 14 A and B are cross-sectional views taken along line 14—14 of FIG. 18, illustrating the hinge mechanism of a first side dumpgate.

FIGS. 15A and B are cross-sectional views taken along line 15—15 of FIG. 16, illustrating the hinge mechanism of a second side dumpgate.

FIG. 16 is a partial cutaway view illustrating the spreading mechanism of the present invention.

FIG. 17 is a cross-sectional view taken along line 17—17 of FIG. 16, illustrating the spreading mechanism of the present invention.

FIG. 18 is a perspective view of the dumpbody of the present invention mounted on a truck chassis and illustrated in side dump position.

DETAILED DESCRIPTION OF PREFERRED EXEMPLARY EMBODIMENTS

The present invention comprises a dumpbody hingedly-attached to a truck frame as illustrated in FIG. 18. The body is capable of tipping toward the right, toward the left or toward the rear of the truck. The dumpbody is mounted low and close to the frame, to provide a very stable truck having a low center of gravity.

Figure 1:
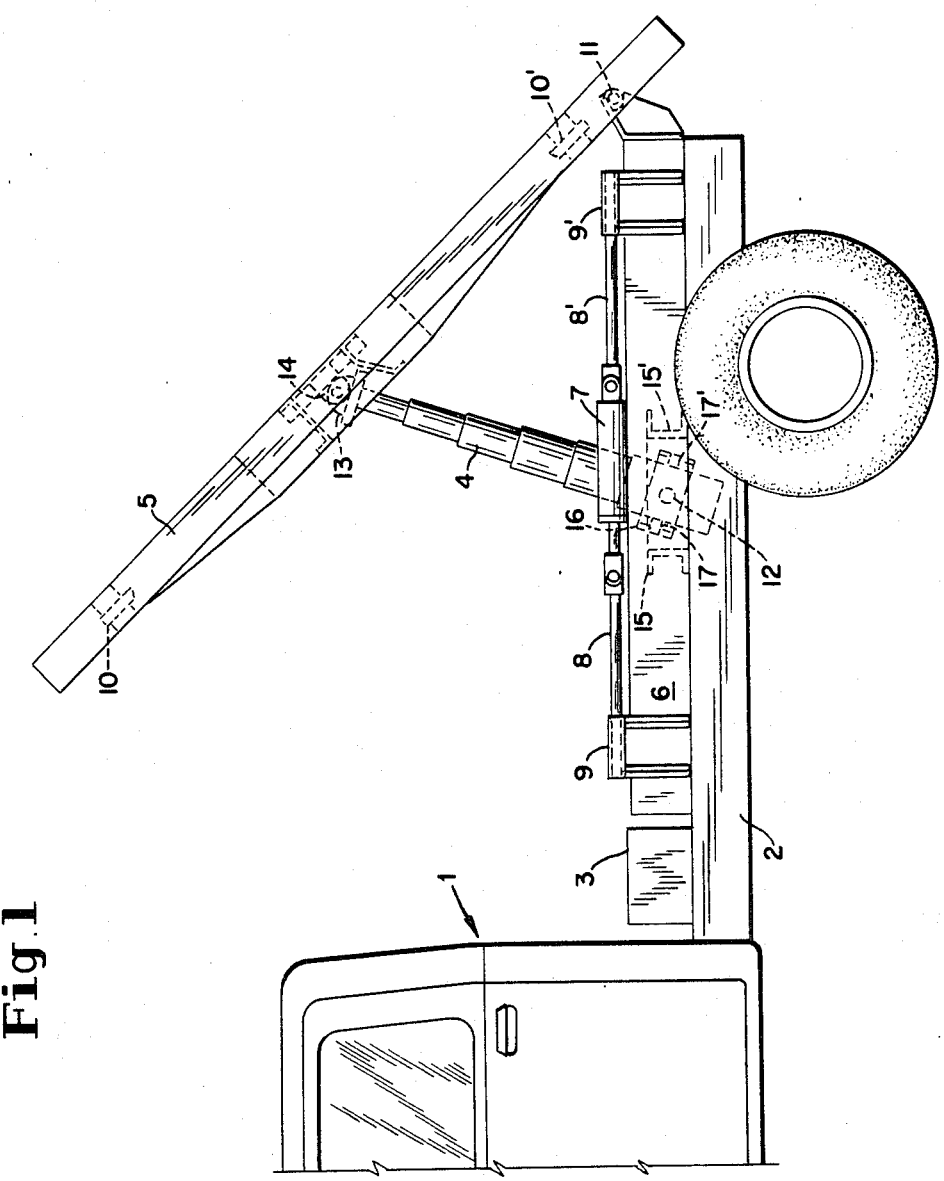
FIG. 1 is a side view of a dump truck with the dumpbed tilted towards the back end.

FIG. 1 is a side view of the working mechanism for tilting the dumpbody towards the rear of the truck. The vertical load retaining sides of the dumpbody are not shown in FIG. 1. A truck having a cab 1 and frame 2 is utilized for mounting the dumpbody and mechanism. Box 3 is a protective steel box utilized to house the hydraulic valves, manifold and electric solenoids utilized by the present invention. The hydraulic pump and reservoir would be located in the vicinity of box 3 but are not shown in FIG. 1. Five-stage telescoping hydraulic hoist cylinder 4 is shown mounted to the subframe 6 by double trunnion 16. Six-stage and seven-stage telescoping cylinders can also be utilized when larger trucks or dumpbodies are desired, or when larger loads are desired. The dumpbody bed or platform 5 is attached to the upper end of hydraulic cylinder 4 by perpendicular axes 13 and 14. The hoist subframe 6 is mounted directly to truckframe 2 and is utilized to carry the necessary hinges for tilting the dumpbody in any of three directions.

Double-acting hydraulic cylinder 7 is utilized to retract and extend hingepins 8 and 8' which ride in hinge guide bushings 9 and 9' respectively. Pins 8 and 8' will engage body hinge pivot bushings 10 and 10' when extended by cylinder 7. In FIG. 1 pins 8 and 8' have been retracted from engagement with bushings 10 and 10' to allow the dumpbody to tilt towards the back end of the truck as illustrated.

When the body is tilted towards the left as illustrated in FIG. 2, then pins 8 and 8' are extended by cylinder 7 to engage bushings 10 and 10' respectively, threrby allowing the dumpbody to tilt towards the left by pivoting on pins 8 and 8'. Rear hinge pins 11, better illustrated in FIG. 2, are operated by rear hydraulic cylinder 7" in a manner similar to the operation of pins 8 and 8' and cylinder 7.

When dumping to the rear as illustrated in FIG. 1, telescope cylinder 4 pivots about lower pivot 12 and upper pivot 13. For tilting left and right lower pivot 17 and upper pivot 14 are utilized. Cross members 15 and 15' also illustrated in FIG. 3, are utilized to house double trunnion frame 16 which carries lower pivots 12 and 17.

FIG. 2 illustrates the body of the present invention tilted towards the left side of the truck. Again the side walls of the dumpbody are not shown in order to more clearly illustrate the dumping mechanism. When a short dumpbody as illustrated in FIGS. 1 and 2 is utilized, hoist cylinder 4 will be extended fully when dumping to either the left, right or rear positions. However, when a longer body is utilized in which the dimension of the body from front to back is significantly greater than that from side to side, it is only necessary to fully extend hoist cylinder 4 when dumping to the rear of the vehicle. When dumping either to the left or right side hoist cylinder 4 need not be fully extended to attain the separation height necessary to provide for full-angle tilting of the dumpbody. The extension of telescoping cylinder 4 will be curtailed through the operation of switches illustrated in FIGS. 9A and 9B and detailed later in the specification which detect and limit the degree of tilt.

In FIG. 3 the bed 5 has been removed to reveal the underlying lift components. Hoist subframe 6 and box 3 are shown mounted to truckframe 2. Crossframe members 15 and 15' are illustrated carrying double trunnion 16 with pivot hinges 12 and 17. Vertically-extending telescoping cylinder 4 is shown at the approximate center of the hoist subframe 6. The left and right tilt pin mechanisms, as well as the rear tilt pin mechanisms, are also illustrated in FIG. 3. Front bar 29 of hoist subframe 6 is illustrated as carrying switch SW2 utilized to detect the separation of the dumpbody and the hoist subframe 6.

Figure 4A:
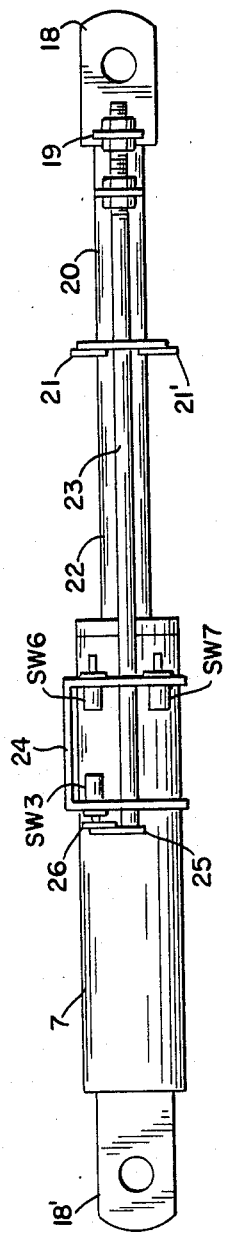
FIGS. 4A and 4B are side views of a hydraulic hinge cylinder entended and retracted.
Figure 4B:
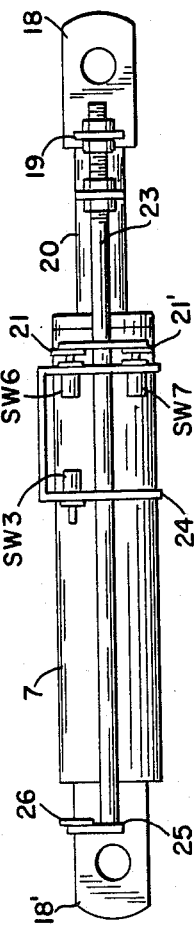
Figure 5:
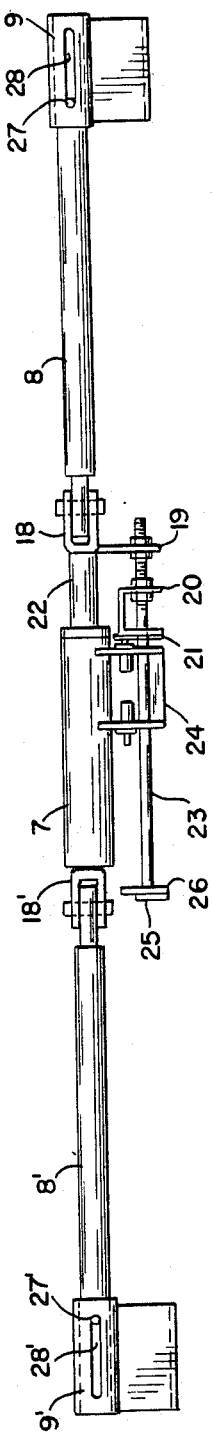
FIG. 5 is an overhead view of a hydraulic hinge cylinder of the present invention.

FIGS. 4A and 4B and FIG. 5 illustrate the details of the tilt-hinge-pin-drive mechanisms. The principle of operation for the tilt hinge pins is identical for the left, right and rear hinges. A common control system is utilized to operate all of the hinge pin engagement mechanisms. In order to tilt the dumpbody in a desired direction the hinge on that side or end of the truck body must be engaged and the other two hinges must be disengaged. In order to engage the desired hinge the corresponding cylinder must be utilized to fully extend the hinge pins. To disengage the appropriate hinges the cylinder must be utilized to retract the appropriate hinge pins. The electrical and hydraulic interconnections of these cylinders and their associated sensing switches is detailed further during the discussion of the schematic FIGS.

As seen in FIGS. 4A and 4B and FIG. 5, each of the three hinge-drive mechanisms has three normally open spring-loaded plunger-type switches SW3, SW6 and SW7 which are operated during extension or retraction of the hydraulic cylinder 7. When the cylinder is fully extended, as illustrated in FIG. 4A, the plunger on switch SW3 is depressed to activate switch SW3. When the cylinder is fully retracted, as illustrated in FIGS. 4B and 5, the plungers of SW6 and SW7 are depressed to activate those switches.

Cylinder clevises 18 and 18' are provided for attachment to hinge pins 8 and 8'. Bracket 19 welded to clevise 18 is utilized to move control rod 23 in unison with the extension of cylinder shaft 22. Bracket 20 is also carried on control rod 23 and has spring mounted pads 21 and 21' which are utilized for depression of the plungers of switches SW6 and SW7 respectively. Bracket 25 is provided at the far end of control rod 23 for mounting of spring cushion pad 26 which is utilized to activate the plunger of switch SW 3. Bracket 24 which carries switches SW3, SW6 and SW7 is attached to cylinder 7 to move therewith.

Cylinder 7 is not mounted to frame 2 or hoist subframe 6, but is allowed to travel freely in a horizontal direction as needed. Therefore, as shaft 22 of cylinder 7 is extended, shaft 22 will travel towards the right and cylinder 7 will travel towards the left as viewed in FIGS. 4A, 4B and 5. When shaft 22 is fully extended spring pad 26 will activate switch SW3, and when shaft 22 is fully retracted pads 21 and 21' activate switches SW6 and SW7 respectively.

To accomplish the floating mounting of cylinder 7, hinge pins 8 and 8' are utilized to carry the cylinder. Guide pins 27 and 27', illustrated in FIG. 5, are engaged in holes in hinge pins 8 and 8' respectively. These guide pins 27 and 27' travel in slots 28 and 28' in hinge guide bushings 9 and 9'. As shaft 22 is extended by cylinder 7, pins 27 and 27' will move in slots 28 and 28' as hinge pins 8 and 8' extend through guide bushings 9 and 9'. If either pin 8 or 8' reaches the end of its intended travel prior to the other hinge pin, then guide pin 27 or 27' will contact the outer end of slot 28 or 28'. The contact of the guide pin with the outer edge of its guide slot will stop the motion of the respective hinge pin and force the other hinge pin to move until the end of the total stroke of cylinder 7, at which time both pins 27 and 27' will be at the outer end of their respective guide slots 28 and 28'.

Figure 6A:
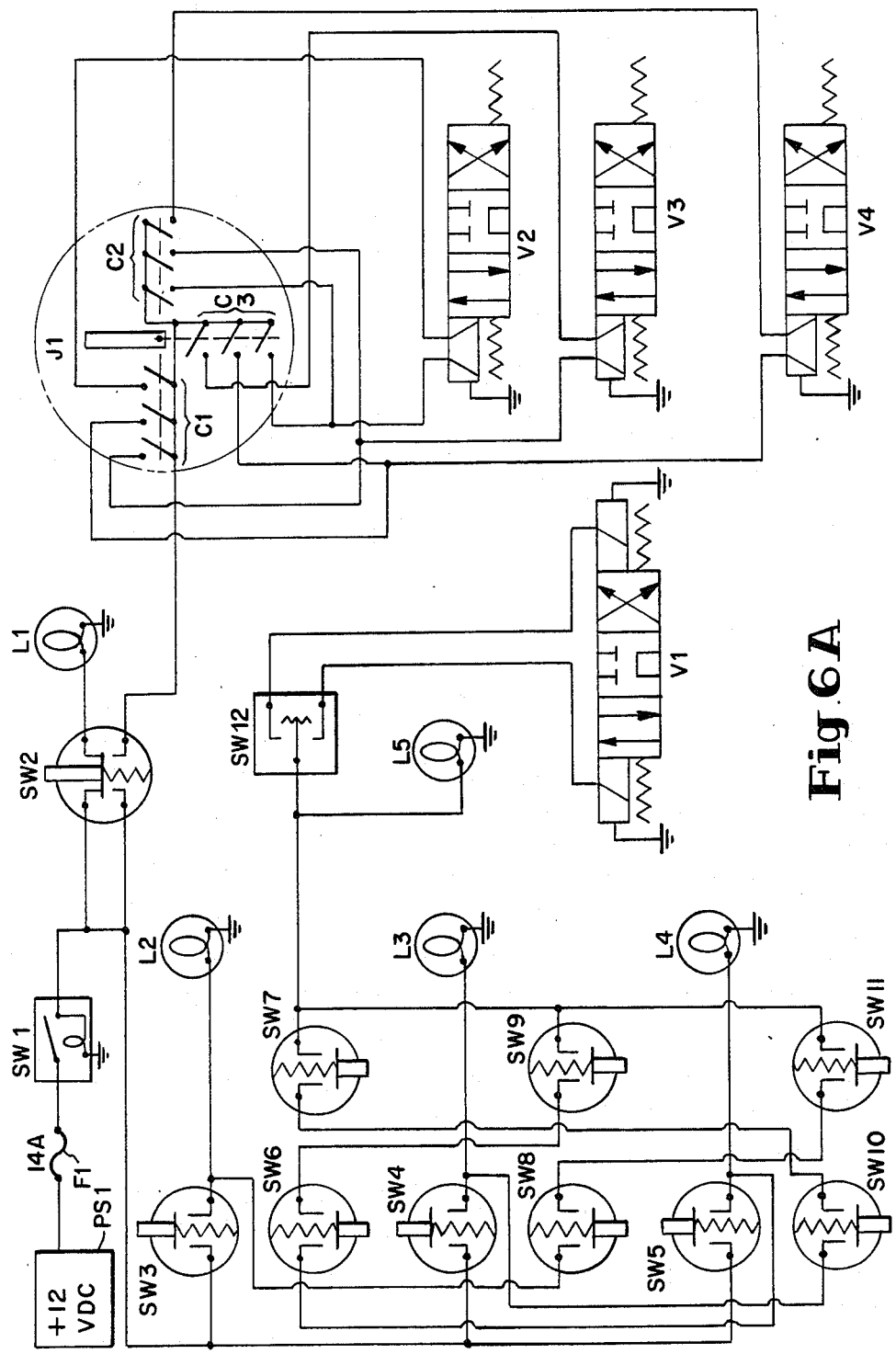
FIGS. 6A through 6D are schematic diagrams illustrating the electrical control system of the present invention.

FIG. 6A illustrates the components of the electrical portion of the control system for tilting of the dumpbody of the present invention. A 12-volt power source PSl is utilized by the electrical portion of the control mechanism. A 14 amp fuse Fl protects the entire electrical circuit. Main power switch Sl is utilized to supply power to the electrical system.

Body detection switch SW2, also illustrated in FIG. 3, is utilized to detect a condition where the dumpbody is not resting on the hoist subframe 6. As illustrated in FIG. 6A, detection switch SW2 indicates a body up condition. When in the body up state, SW2 disconnects selector switch Jl from electrical power, thereby preventing activation of selector switch Jl after the body has begun to rise. Selector switch Jl is utilized to select left, right or rearward tilting of the dumpbody. Activation of switch Jl causes the appropriate hinges to engage and disengage. When lowered the body will depress switch SW2, thereby allowing operation of selector switch Jl. Indicator light Ll is activated to indicate body up condition and is deactivated upon return of the dumpbody to a resting position.

Normally-open spring loaded switches SW3, SW6 and SW7 are mounted on the hinge cylinder 7 for the left side hinge, as illustrated in FIGS. 4A, 4B and 5. Switches SW5, SW 10 and SWll are mounted on the cylinder 7' utilized in the right hinge mechanism in corresponding position to the switches of the left-hand hinge mechanism. Switches SW4, SW8 and SW9 are associated with the rear hinge activitation mechanism 7" in corresponding positions.

As previously noted, for the dumpbody to be tilted to the left, the left hinge pins 8 and 8' must be engaged in sockets 10 and 10' illustrated in FIG. 1. In order for the pins to be engaged in their sockets, the left hinge cylinder 7 must be fully extended as illustrated in FIG. 4A. The hinge pins for the right and rear hinges must be disengaged. This is accomplished by the full retraction of the hinge cylinders 7' and 7' associated with the right and rear hinges. When the three cylinders are in their appropriate positions a circuit is completed and indicator light L2, indicating tilt to the left, is activated along with indicator light L5, which indicates a "hoist ready" condition. One side of the hoist control switch SW12 is also energized once the switches SW3 through SWll indicate proper engagement and disengagement of the appropriate hinge pins. The hoist control switch SW12 can then be energized by the operator to control the solenoid valve Vl in order to raise or lower the vertical telescoping hoist 4.

As soon as the dumpbody begins to raise, switch SW2 will disconnect the power to the control switch Jl, thereby eliminating further selection of tilt direction. Indicator light Ll will light to indicate that selector switch Jl has been disabled and the dumpbody is raised above the hoist subframe 6.

V2 is the solenoid valve operating the hydraulic cylinder 7' for control of the left side hinge. V4 is the solenoid valve used to operate the hydraulic cylinder 7' of the right side hinge mechanism. V3 is the solenoid valve utilized for operation of the back end pin cylinder 7" for backend engagement/disengagement mechanism.

Figure 6B:
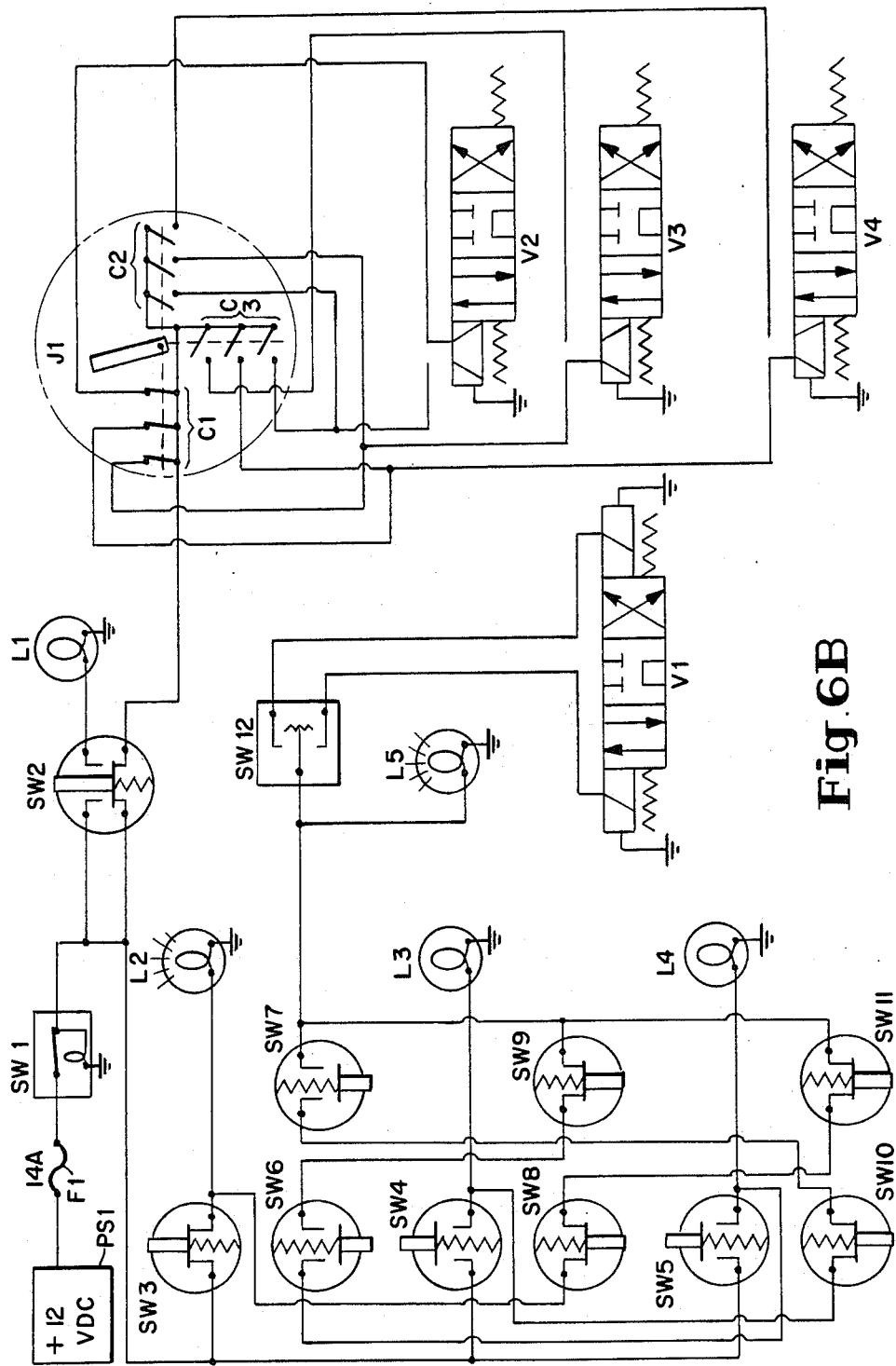
Figure 6C:
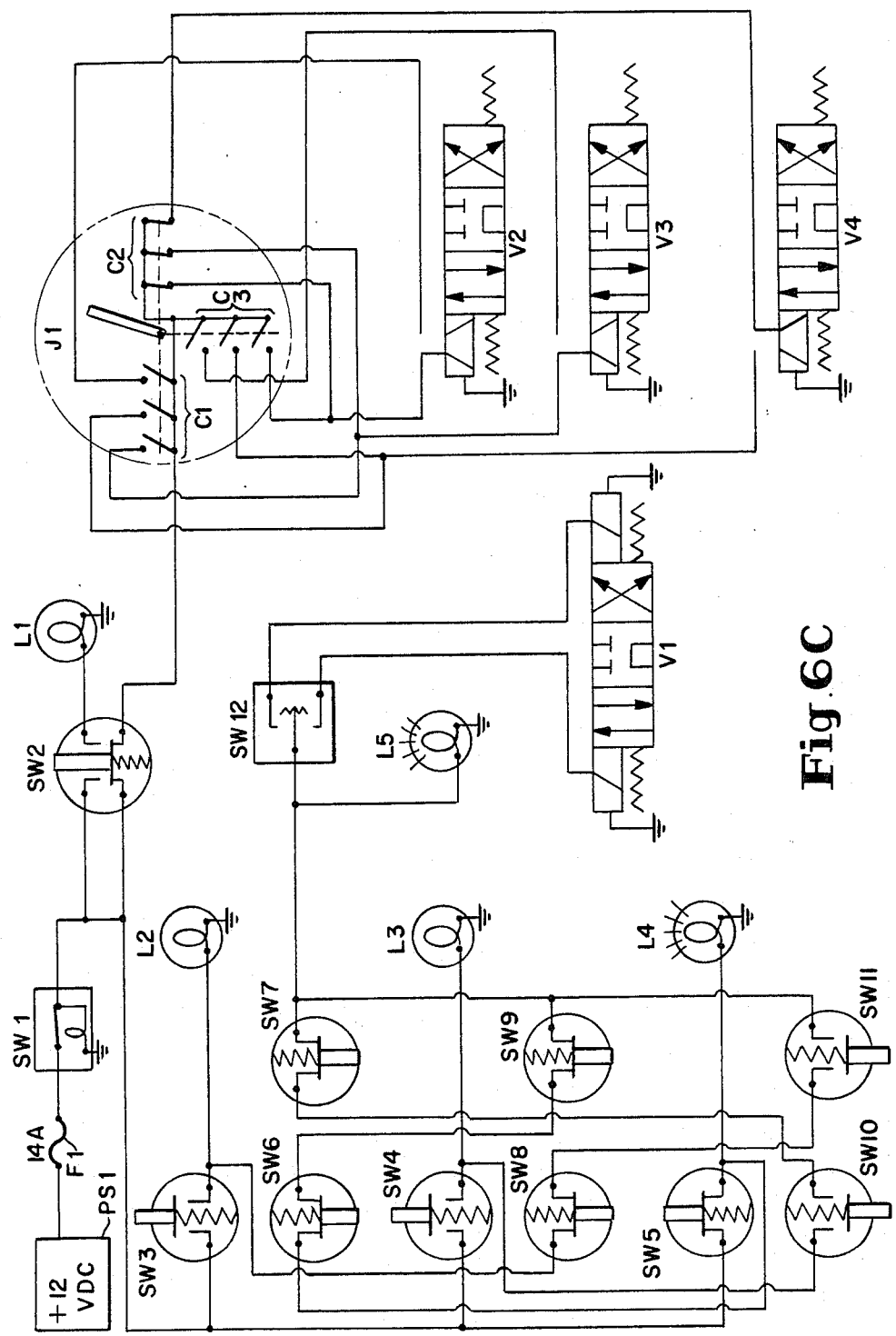

FIG. 6B illustrates the switching and energizing sequence for tilting the dumpbody towards the left. FIG. 6C illustrates the switching and energization sequence for tilting the dumpbody to the right, and FIG. 6D illustrates the switching and energization sequence for tilting the dumpbody towards the back end of the vehicle.

Referring now to FIG. 6B, main switch Sl is closed, and initially position protection switch SW2 is in the downward position with the dumpbody resting upon the hoist subchassis 6. None of the indicator lights Ll through L5 is energized. First selector switch Jl is tilted towards the left to close the first set of contacts Cl. Solenoid V2 is activated to extend the left hinge pins, and solenoids V3 and V4 are activated to retract the rear hinge pins and the right side hinge pins. After full travel of the three pin drive cylinders, the pin position indication switches SW3 through SWll will be in the positions as shown. Switches SW3, SW8, SW9, SW10 and SWll will be depressed, and switches SW4, SW5, SW6 and SW7 remain extended. By depression of switch SW3, the left tilt indicator light L2 will be activated. Also, flow from the main switch SWI will flow through the now-closed SW3 down to the closed switch SW8 and then down through the closed switch SWll and back up to switch SW12, and will energize light L5. Light L5 will indicate to the operator that he may now operate the vertical lift telescoping cylinder 4, and the closing of switch SW12 will allow solenoid valve Vl to be operated to drive the cylinder 4, either to raise or lower the dumpbody. Once the dumpbody begins to raise, then switch SW2 will also raise and activate indicator light Ll.

As illustrated in FIG. 6C, main power switch SW1 is again depressed and switch SW2 begins in a downward position. Selector switch Jl is then thrown to close contacts C2. This will energize solenoid V4 to cause the right side hinge actuation cylinder 7' to extend the right side hinges, and solenoids V2 and V3 will be actuated so as to cause left and rear hinge pin cylinders 7 and 7" to retract the left hinge pins and the rear hinge pins, thereby allowing the dumpbody to tilt to the right. Upon full extension and retraction of the hinge pins switches SW5, SW6, SW7, SW8 and SW9 will be depressed, and switches SW3, SW4, SW10 and SWll will remain extended. Depression of switch SW5 will cause left tilt indicator light L4 to be activated. Also, activation energy will be supplied through switches SW5, SW6 and then SW9 in sequence to switch SW12 and indicator light L5. The hoist may then be raised or lowered by the operator as described above.

Figure 6D:
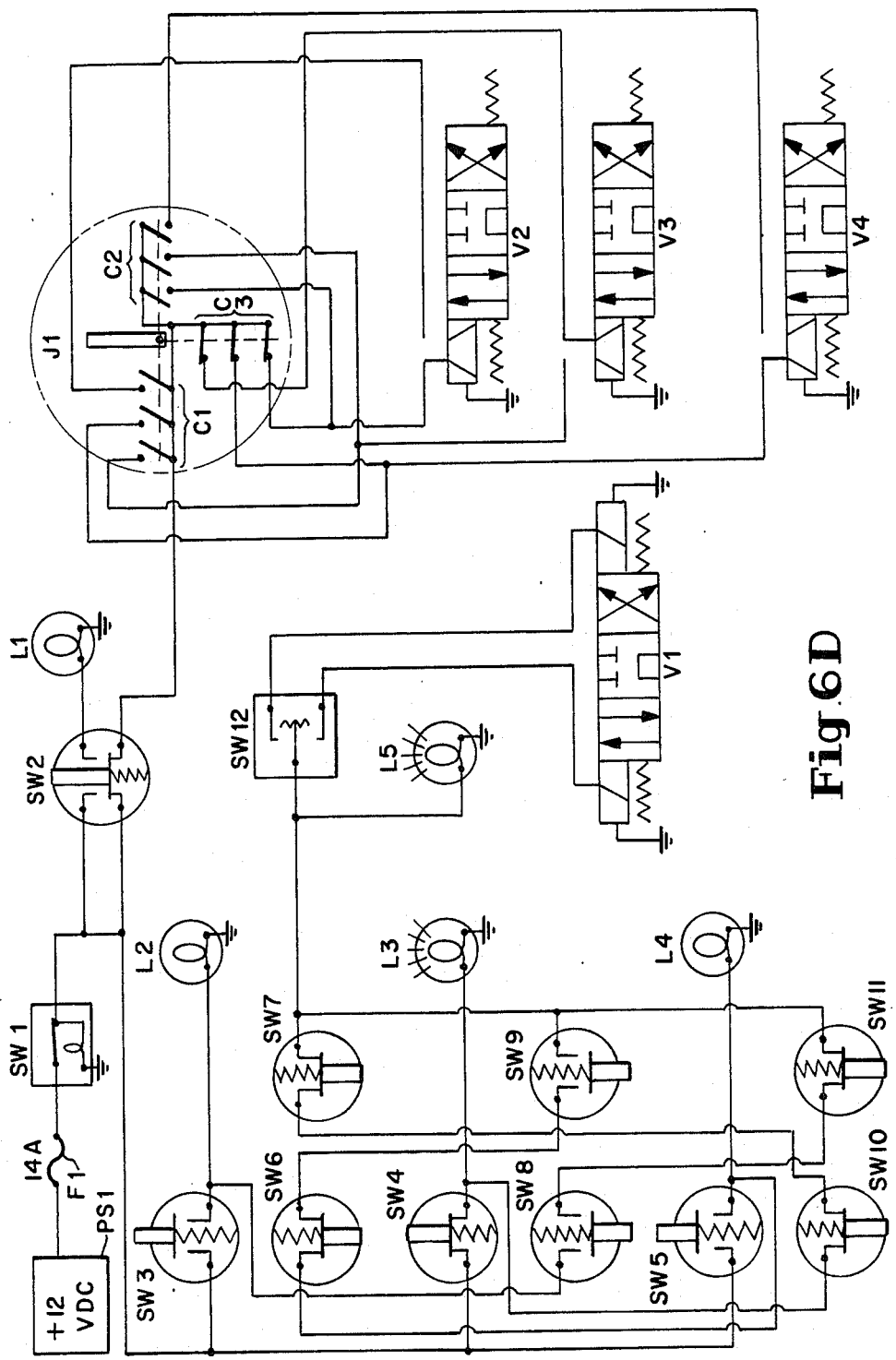

In FIG. 6D the main switch S1 is again activated and the position detection switch SW2 begins in the down position. Selector switch J1 is tilted to activate the set of contacts indicated as C3. This will activate solenoid V3, the back end solenoid, to operate back cylinder 7" to extend the back end hinge pins into engagement, and will cause the left and right solenoids V2 and V4 to activate the left and right hinge actuation cylinders 7 and 7' to retract the left and right hinge pins. Upon full retraction or extension of the appropriate hinge pins, switches SW4, SW6, SW7, SW10 and SW11 will be depressed as indicated in FIG. 6D. Switches SW3, SW5, SW8 and SW9 will remain in extended position, as indicated. In this instance, switch SW4 through closing will provide activation energy to indicator light L3, to indicate a rearward tip of the dumpbody. Also power will be supplied through switches SW4, SW7 and SW11 to switch SW12 switch and indicator light L5 for the above-described reasons. The dumpbody may then be raised by the operator, and switch SW2 will rise and light indicator light L1.

The hydraulic schematic illustrated in FIG. 7 illustrates the vertical lift cylinder 4 and the three hinge pin cylinders 7, 7' and 7". Also illustrated are solenoid valves V1, V2, V3 and V4, solenoid valve V1 controling the vertical hoist telescoping cylinder 4, solenoid valve V2 controling the left hinge pin cylinder 7, solenoid valve V4 controling the right hinge pin cylinder 7', and solenoid valve V3 controling the back end hinge pin cylinder 7". Relief valves R1 and R2 are utilized to protect the hoist cylinder and hinge cylinders, respectively. The pump P is utilized to supply the fluid pressure to cylinders 4, 7, 7' and 7". Return line filter F is utilized to clean the hydraulic fluid on its way back to the resevoir (not shown).

Hydraulic fluid from pump P flows first to the three-position valve V1 which controls the raising and lowering of hoist cylinder 4. When V1 is in the neutral "hold" position, oil flows through and onto the valves V2, V3 and V4, for control of the hinge pin cylinders 7, 7' and 7". Valve solenoid V1 must be in the neutral or "hold" position in order for fluid to flow to solenoids V2, V3 and V4. This prevents the engagement of disengagement of hinge pins during raising or lowering of hoist cylinder 4. All three valves V1, V2 and V3 must operate simultaneously for hinge cylinders 7, 7' and 7" to receive pressurized oil flow. If all three solenoid valves V2, V3 and V4 are not acting simultaneously, such as in the case of malfunction, none of the three hinge cylinders 7, 7' and 7" will receive pressurized oil flow. This insures that all pin hinges will be engaged or disengaged simultaneously.

Figure 8:
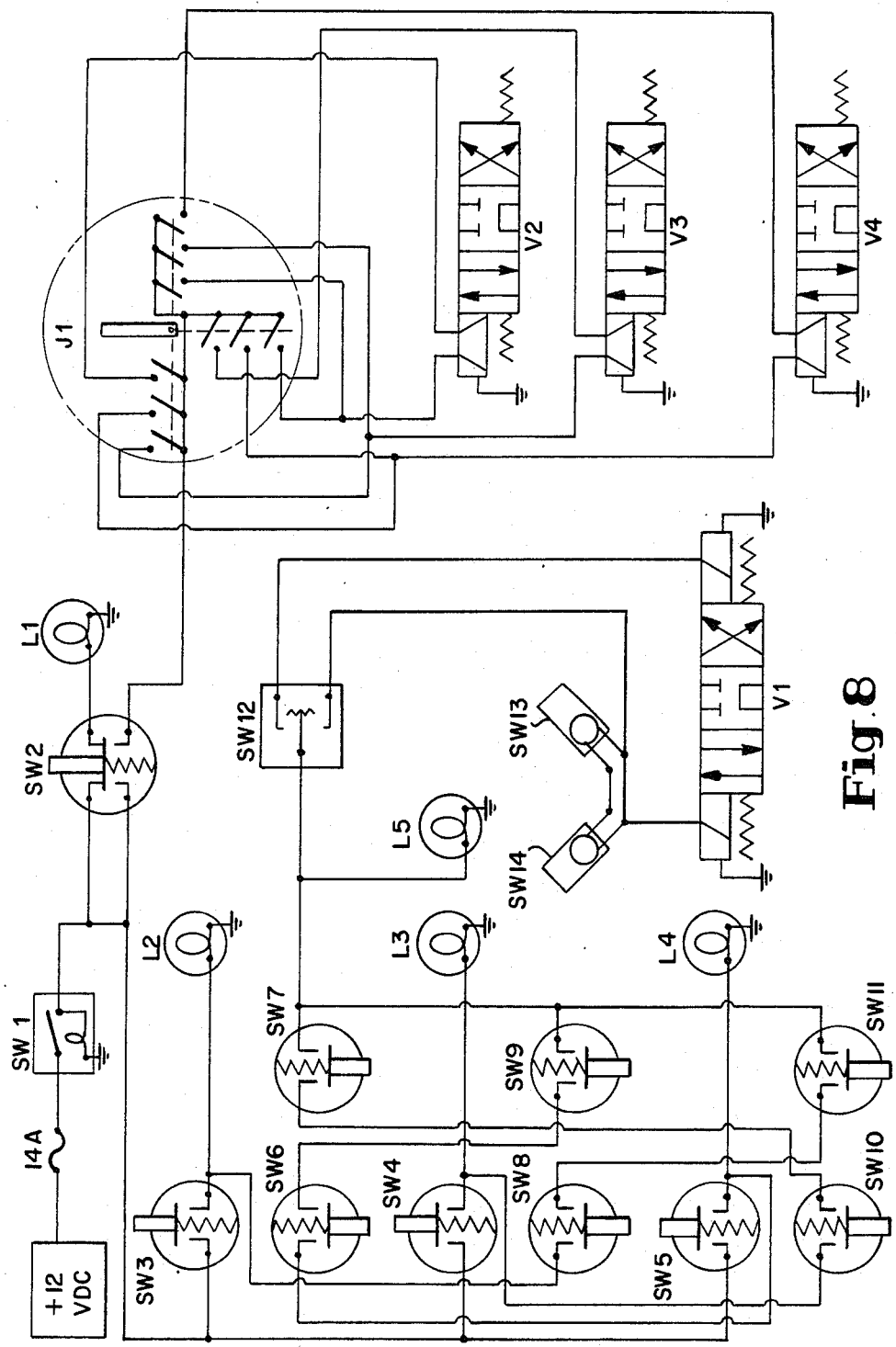
FIG. 8 is an electrical schematic for control of the tilting mechanism of the present invention with mercury switches utilized to limit tilting angle.

FIG. 8 illustrates a modified electrical schematic utilized for control of the hoist mechanism of the present invention. The schematic illustrated in FIG. 8 is modified from those schematics illustrated 6A-6D in the addition of mercury-actuated switches SW13 and SW14. These switches SW13 and SW14 are mounted on a bracket installed on a cross member of the dump body. The switches are mounted at 90 degrees relative to each other and each is mounted at 45 degrees from the horizontal component of the dumpbody. These switches are mounted anywhere along the dumpbody conveniently out of the way of obstacles, so long as they move with the tilting of the dump body. The mercury ball of both switches must be in a position so as to complete the circuit in order for the solenoid valve V1 to allow for the raising of the hoist 4. Thus, when the dumpbody is tilted 45 degrees either left or right, the ball of mercury in one of the switches SW13 or SW14 will roll away from its contacts as the switch reaches a horizontal position, and will prevent further raising of the dumpbody beyond a 45-degree angle from horizontal. When the mercury rolls away from the contacts within the switch, it will break the electrical circuit and valve V1 will close, stopping the oil flow to the hoist 4, and thus limiting the stroke of the hydraulic cylinder to the point where the dumpbody is at a 45-degree angle relative to horizontal.

This 45-degree angle will be maintained as a maximum regardless of the slope of the truck chassis 2. The sidewards tilting of the chassis will simply limit the angle obtainable between the dumpbody and the chassis itself, never allowing the dumpbody to go beyond a 45-degree angle relative to horizontal. By maintaining this angle limit, the stability of the truck as a whole is maintained to the maximum possible extent.

Figure 9A:
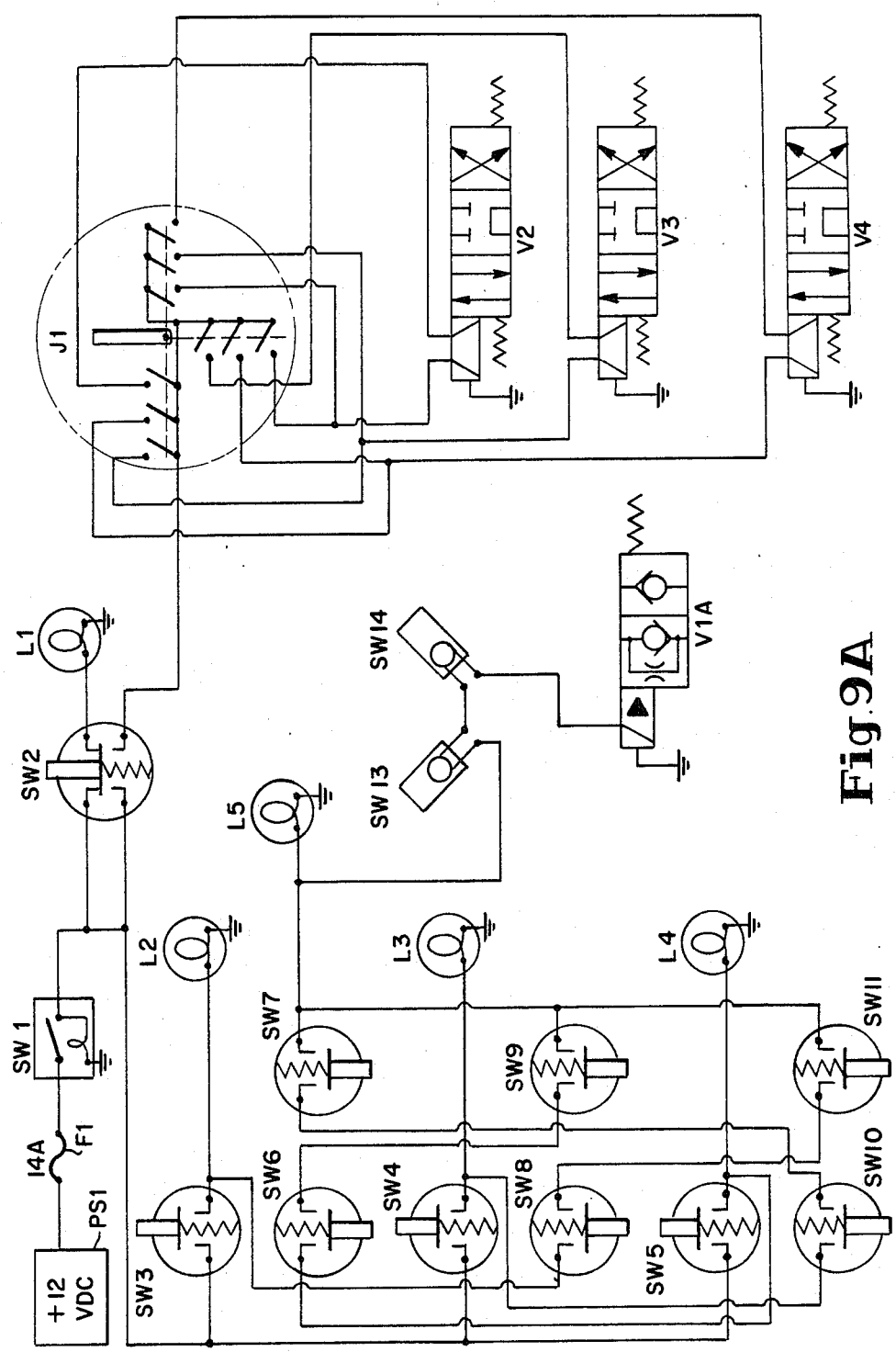

FIG. 9A shows the electrical control system for the hoist and hinge mechanism of the present invention to be utilized in conjunction with the central hydraulic control system illustrated in FIG. 9B. The central hydraulic system may be included in a truck which will operate other hydraulic systems and mechanisms along with the hydraulic lift and hinge mechanisms of the present invention. The schematic of FIG. 9A differs from the prior electrical schematics in that three-position valve V1 has been replaced by two-position valve V1A and hoist control switch SW12 has been eliminated. The switch SW12 and the three-position valve are no longer necessary due to control through the central hydraulic system. Hydraulic fluid is no longer pumped directly to the hinge valves through the main hoist valve V1. A separate valve V6 (illustrated in FIG. 9B) of the central hydraulic control system is utilized to alternatively supply hydraulic fluid to valve V1A or the valves of the hinge cylinders.

Valve V5, FIG. 9B, is actuated by switch SW15, and in a first position is simply utilized for recirculation of hydraulic fluid during warm-up of the system. Valve V5 in an alternative position can be utilized to supply hydraulic fluid to a sand spreaded if the truck is so equipped. Valve V6 is a three-position valve that serves the important function of isolating the hoist control cylinder 4 and the hinge engage/disengage cylinders 7, 7' and 7". In a first position, valve V6 applies hydraulic fluid to raise and lower the hoist 4, if selector valve V1A is in the energized position and allows flow to pass through to the hoist 4. The energization of valve V1A is determined by the hinge position indicator switches SW3 through SW11 and mercury switches SW13 and SW14 as previously discussed. In an alternative position, valve V6 will allow gravity to lower hoist 4 and will direct hydraulic fluid flow to the hinge cylinder valves V2, V3 and V4, thus permitting hinge selection to be accomplished when the body position switch SW2 allows for actuation of selector switch J1.

This unique arrangement allows seemingly noncompatible hydraulic systems to perform efficiently and cooperatively, regardless of the discrepencies in compatibility. The hydraulic system utilized to control the hoist 4 and hinge cylinders 7, 7' and 7" is of the open-center type. The central hydraulic system on the truck which is utilized to control and supply hydraulic fluid to all functions, including but not limited to the hoist mechanism, hinge mechanisms, sand spreaders, snow plows and such, can be comprised of the open center, closed center or closed center load sensing hydraulic type system. Furthermore, the valves for the hoist and hinge functions are solenoid operated, but the valves for other functions need not be. Since the closed center load sensing type of hydraulic system is by far the most efficient and energy saving type available, it is recommended that it be the preferred type for the central hydraulic system.

FIG. 10 illustrates the combined central hydraulic system and hoist mechanism hydraulic system of the present invention. The central hydraulic system illustrated in FIG. 10 is of the closed center load sensing type, as indicated by pump P1, designated as LS. As illustrated in the schematic of FIG. 10, valve V5 has a closed center and in one working position will circulate the hydraulic oil back to the resevoir. In its other position, valve V5 provides hydraulic fluid flow to the sand spreader controls. Valve V6 in one of its working positions supplies hydraulic fluid through selector valve V1A to telescoping hydraulic hoist cylinder 4. In its other position, valve V6 allows gravity to lower the hoist and returns hydraulic fluid from the hoist cylinder 4 back to the resevoir. While in this position, valve V6 is simultaneously supplying hydraulic fluid to valves V2, V4 and V3 for hydraulic hinge cylinders 7, 7'and 7".

Flow control valve FC1 is utilized to automatically control the amount of flow from hoist cylinder 4 back to the reservoir, regardless of the weight of the load. Check valve C1 prevents flow to cylinder 4, except through selector valve V1A and allows flow back to the resevoir when valve V6 is in the lowering position. Relief valves R1 and R2 are utilized to protect hydraulic cylinder 4 and hinge cylinders 7, 7' and 7", respectively. F1 is a return line filter which cleans the hydraulic fluid on its way back to the resevoir.

FIG. 11 illustrates a typical operator's control panel for control of hoist cylinder 4 and hinge cylinders 7, 7' and 7" in a system wherein a central hydraulic system is not utilized. Selector switch J1 is illustrated surrounded by tilt indicator lights L2, L3 and L4. The main power switch SW1 and hoist control switch SW2 are illustrated with body up light L1 and hoist ready light L5.

Figures 12A, 12B:
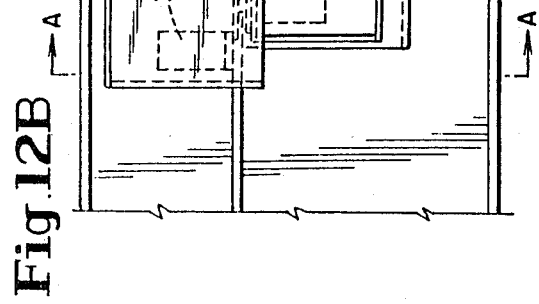
FIG. 12A and B are detailed view illustrating the mounting of the switch utilized for detecting dumpbody movement relative to truck chassis.

FIG. 12 provides a detailed view of the mounting of the body position detection switch SW2. Switch SW2 is supported by bracket 34 which is vertically adjustable by means of a slotted hole provided in bracket 35, which is rigidly attached to subframe cross member 29. Bracket 31 which carries spring actuation pad 32 is welded to dumpbody bed cross member 30. Spring actuation pad 32 therefore contacts the plunger of switch SW2 when the dumpbody is in the lowered position. When the dumpbody is tilted to either the left or right side or towards the rear, dumpbody bed cross member 30 will separate from subframe member 29 and carry with it bracket 31 and acuation pad 32, thereby releasing the force on the plunger of switch SW2. Cover 33 is provided to protect SW2 and the contact area of pad 32.

It is understood that some variation in the controls herein detailed may occur without changing the concept or operational characteristics of the invention herein described.

Figure 13:
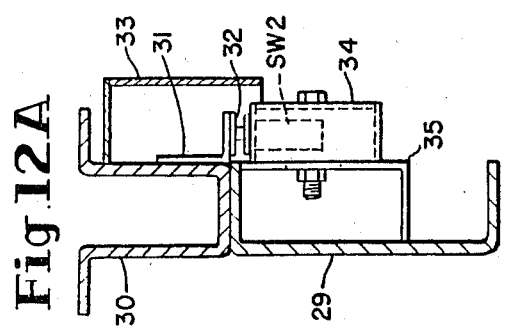
FIG. 13 is a front view of the operator's panel for a truck utilizing a central hydraulic system for control of bed-tilting and other hydraulic mechanisms.

The operator's control panel illustrated in FIG. 13 is utilized with a dumpbody mechanism which is incorporated into a central hydraulic control system. Two-position rocker switches SW16 through SW 20 are 7 utilized to control various hydraulically-actuated mechanisms associated with the truck. Three position rocker switch SW15 is utilized to control the up and down actuation of hoist cylinder 4. Three-position rocker switch SW14 can be utilized to warm up the hydraulic fluid or to actuate the spreader. This control panel is also equipped with main power switch SW1, direction select switch J1, tilt indicator lights L2, L3 and L4, body up light L1 and hoist ready light L5. These switches and lights are utilized for control of the central hydraulic system and body tilt mechanism as earlier described. The cross-sectional view of side gate 37 illustrated in FIGS. 14A and B is as viewed as indicated by line 14—14 of FIG. 18. 36 is the floor of dumpbed 5, V 37 folds down on hinge 38 to be even with floor 36. By folding down side gate 37 into this position, the floor 36 is extended beyond the side to allow the dumpbody to dump the load farther from the side of the truck chassis. Side gate 37 is provided with latches to maintain it in the upright position illustrated in FIG. 14B. As illustrated in FIG. 14A a flange at the lower end of side gate 37 comes to rest against the side rail of dumpbed 5 to maintain gate 37 aligned with floor 36 when side gate 37 is in the lowered position.

A second embodiment of a side dump gate 40 is illustrated in FIGS. 15A and B as viewed by line 15—15 of FIG. 16. This dump gate is hinged towards its upper end at hinge 43, which is attached to rear body corner pillar 39. In FIG. 15A the side gate 40 is illustrated locked in place by lock bar 42 attached to shaft 41. Main gate pivot 43 rotates within bushing 44. Several bars, like bar 42, are spaced every three to four feet along the length of side gate 40. The shaft 41 is bent at a 90 degree angle at one end to form handle 49, illustrated in FIG. 16 Handle 49 is then actuated by the operator to rotate shaft 41 to cause bars 42 to unlock side gate 40, to allow side gate 40 to swing free of body bed 5.

The optional sander mechanism is illustrated in FIG. 16 attached to the truck chassis 2 below the front left corner of the dump body. The left side gate 40 is illustrated hinged near its upper end by hinge bushing 44 and hinge pin 43, engaged in front corner body pillar 45. Truck cab protector 46 is also illustrated mounted on freestanding brackets 50 which are attached to the truck frame 2 just ahead of dump body. Auger 47 running the length of the dump body supplies the material to be spread to the spreader. Auger 47 is driven by hydraulic orbit motor 48. Rotation of auger 47 causes the screw threads of auger 47 to drive the material contained in the dump body towards the front left corner of the dump body.

Sand or material from the auger 47 is dropped into funnel 55, which is mounted to the chassis 2 by bracket 59. Funnel 55 directs the sand onto spinner 51 which is driven by hydraulic orbit motor 52. This mechanism is also illustrated from the rear in FIG. 17 as viewed by line 17—17 FIG. 16. By location of the sand spreader in this point on the truck body, sand is spread on the roadway ahead of the drive wheels of the truck.

As the sand adjacent the auger 47 begins to deplete, the operator will tilt the dumpbody towards the left-hand side to supply sand to that corner of the dumpbody in order to provide sand for the auger 47. Side gate 40 is kept in a closed position while operating auger 47 and the sander.

Horizontally-adjustable bracket 53 is utilized to carry spinner 51, and vertically-adjustable bracket 54 allows for adjustment of bracket 53 relative to truck frame 2. Short cover 57 is provided over the front end of auger 47 to prevent the direct dumping of sand into funnel 55 through tilting of the dumpbody. This allows for a more controlled supply of sand through funnel 55 through operation of auger 47. Protective shield 58 is provided to protect the truck cab from sand which is being thrown by the spinner 51. With larger dumpbodies a secondary support bushing 56 may be required on the far end of hinge pivot bushing 10 to receive the end of hinge pin 8, to provide for heavier loads carried by larger dumpbodies.

It is understood that the spinner/sander mechanism could optionally be mounted at the left rear corner of the body or either the right front or right rear corner if desired. The auger would then be operated to deliver sand to the corner in which the spreader was mounted. The same tilting concepts as taught in the present invention herein would be utilized to provide sand to the spinner/spreader mechanism.

Once given the above disclosure, many other features, modifications and improvements will become apparent to the skilled artisan. Such features, modifications and improvements are thus to be considered a part of this invention, the scope of which is to be determined by the following claims:

I claim:
1. In a dump truck, the combination comprising
(a) a chassis frame,
(b) a dump body hingedly connected to said frame and capable of being selectively dumped to either the right or left side or to the rear of said truck,
(c) means for selectively tilting said dump body with respect to said chassis frame either to the right or left side or to the rear of said truck, thereby to selectively place said dump body in its desired dumping mode to the right, left or rear of said truck such that, in combination with the dimensions of said dump body, the center of gravity of the dump body is lower when tilted to the right or left side of the truck than when tilted to the rear of the truck,
(d) an auger means extending longitudinally along a side of said truck body such that the tilting of said body to that side whereat the auger is located serves to feed said auger with any selected material located with said body,
(e) spreader means associated with said auger for spreading said material delivered to it by said auger, and
(f) means for selectively either dumping or effecting the spreading of said material at the side whereat said auger is located.

2. The combination of claim 1 wherein said truck is provided with rear wheels located proximal the rear end of said dump body, said auger is located on the left side of said body and said spreader is located forward of the rear wheels of said truck and is capable of spreading material forward of said rear wheels.

* * * * *